(12) United States Patent
Darbha et al.

(10) Patent No.: US 7,842,653 B2
(45) Date of Patent: *Nov. 30, 2010

(54) PROCESS FOR THE PREPARATION OF LUBRICANTS

(75) Inventors: Srinivas Darbha, Pune (IN); Rajendra Srivastava, Pune (IN); Paul Ratnasamy, Pune (IN)

(73) Assignee: Council of Scientific & Industrial Research, New Delhi (IN)

( * ) Notice: Subject to any disclaimer, the term of this patent is extended or adjusted under 35 U.S.C. 154(b) by 1159 days.

This patent is subject to a terminal disclaimer.

(21) Appl. No.: 11/442,651

(22) Filed: May 26, 2006

(65) Prior Publication Data

US 2007/0004599 A1 Jan. 4, 2007

(30) Foreign Application Priority Data

Jun. 16, 2005 (IN) .................. 1561/DEL/2005

(51) Int. Cl.
*C10M 105/32* (2006.01)
*C11C 1/00* (2006.01)

(52) U.S. Cl. .................. 508/491; 508/463; 554/167; 554/174

(58) Field of Classification Search .................. 508/101, 508/216, 491, 503; 554/167, 174
See application file for complete search history.

(56) References Cited

U.S. PATENT DOCUMENTS

| | | | |
|---|---|---|---|
| 3,278,457 A | 10/1966 | Milgrom | |
| 3,313,834 A * | 4/1967 | Allen et al. | .................. 554/168 |
| 5,482,908 A | 1/1996 | Le-Khac | |
| 5,536,883 A | 7/1996 | Le-Khac | |
| 5,578,090 A | 11/1996 | Bradin | |
| 5,713,965 A | 2/1998 | Foglia et al. | |
| 6,015,440 A | 1/2000 | Noureddini | |
| 6,288,251 B1 * | 9/2001 | Tsuto et al. | .................. 554/169 |
| 6,398,707 B1 | 6/2002 | Wu et al. | |
| 6,399,800 B1 | 6/2002 | Haas et al. | |
| 6,479,689 B1 | 11/2002 | Tojo et al. | |
| 6,768,015 B1 | 11/2002 | Tojo et al. | |
| 6,624,286 B2 | 9/2003 | Hofmann et al. | |
| 6,642,399 B2 | 11/2003 | Boocock | |
| 6,696,583 B2 | 2/2004 | Koncar et al. | |
| 6,712,867 B1 | 3/2004 | Boocock | |
| 6,822,105 B1 | 11/2004 | Luxem et al. | |
| 6,835,858 B1 | 12/2004 | De Jonge et al. | |
| 6,855,838 B2 | 2/2005 | Haas et al. | |
| 7,211,681 B2 | 5/2007 | Furuta | |
| 7,482,480 B2 * | 1/2009 | Srinivas et al. | .............. 554/167 |
| 2004/0044240 A1 | 3/2004 | Grosch et al. | |
| 2005/0027137 A1 | 2/2005 | Hooker | |
| 2007/0004599 A1 | 1/2007 | Darbha et al. | |
| 2007/0083056 A1 | 4/2007 | Srinivas et al. | |
| 2007/0083062 A1 | 4/2007 | Srinivas et al. | |
| 2007/0093380 A1 | 4/2007 | Srinivas et al. | |
| 2007/0167642 A1 | 7/2007 | Oku et al. | |
| 2009/0030140 A1 * | 1/2009 | Eipper et al. | .................. 524/537 |

FOREIGN PATENT DOCUMENTS

| | | |
|---|---|---|
| WO | 00/05327 | 2/2000 |
| WO | 2004/048311 | 6/2004 |

OTHER PUBLICATIONS

Suppes et al., "Transesterification of soybean oil with zeolite and metal catalysts," Applied Catalysis A: General, 2004, pp. 213-223, Elsevier.
Dmytryshyn et al., "Synthesis and characterization of vegetable oil derived esters: evaluation for their diesel additive properties," Bioresource Technology, 2004, pp. 55-64, Elsevier.
Vicente et al., "Integrated biodiesel production: a comparison of different homogeneous catalysts systems," Bioresource Technology, 2004, pp. 297-305, Elsevier.
Furuta et al., "Biodiesel fuel production with solid superacid catalysis in fixed bed reactor under atmospheric pressure," Catalysis Communications, 2004, pp. 721-723, Elsevier.
Soumanou et al., "Improvement in lipase-catalyzed synthesis of fatty acid methyl esters form sunflower oil," Enzyme and Microbial Technology, 2003, pp. 97-103, Elsevier.
Khare et al., "Immobilization of Rhizopus japonicus lipase on celite and its application for enrichment of docosahexaenoic acid in soybean oil," Food Chemistry, 2000, pp. 153-157, Elsevier.
Siler-Marinkovic et al., "Transesterification of sunflower oil in situ," Fuel, 1998, pp. 1389-1391, Elsevier.
Schuchardt et al., "Transesterification of Vegetable Oils: a Reivew," J. Braz. Chem. Soc., 1998, pp. 199-210.
Suppes et al., "Calcium Carbonate Catalyzed Alcoholysis of Fats and Oils," JAOCS, 2001, pp. 139-145, AOCS Press.
Darnoko et al., "Kinetics of Palm Oil Transesterification in a Batch Reactor," JAOCS, 2000, pp. 1263-1267, AOCS Press.
Corma et al., "Catalysts for the Production of Fine Chemicals," Journal of Catalysis, 1998, pp. 315-321, Academic Press.

(Continued)

*Primary Examiner*—Ellen M McAvoy
*Assistant Examiner*—Taiwo Oladapo
(74) *Attorney, Agent, or Firm*—Meyertons, Hood, Kivlin, Kowert & Goetzel, P.C.; Eric B. Meyertons

(57) ABSTRACT

The present invention provides an improved process for the preparation of lubricants from vegetable oil or fat obtained from animal source. The present invention involves a reaction of vegetable oil or fat with an alcohol in the presence of a double metal cyanide catalyst, at a temperature in the range of 150° to 200° C. for a period of 3-6 hrs to obtain the desired bio-lubricant.

7 Claims, No Drawings

OTHER PUBLICATIONS

Brat et al., "Fatty Acid Composition of Margarines and Cooking Fats Available on the Czech Market," Journal of Food Composition and Analysis, 2000, pp. 337-343, Academic Press.

Abreu et al., "Utilization of metal complexes as catalysts in the transesterification of Brazilian vegetable oils with different alcohols," Journal of Molecular Catalysis A: Chemical, 2004, pp. 29-33, Elsevier.

Abreu et al., "New multi-phase catalytic systems based on tin compounds active for vegetable oil transesterificaton reaction," Journal of Molecular Catalyst A: Chemical, 2005, pp. 263-267. Elsevier.

Shimada et al., "Enzymatic alcoholysis for biodiesel fuel production and application of the reaction to oil processing," Journal of Molecular Catalysis B: Enzymatic, 2002, pp. 133-142, Elsevier.

Watanabe et al., "Conversion of degummed soybean oil to biodiesel fuel with immobilized Candida antarctica lipase," Journal of Molecular Catalysis B: Enzymatic, 2002, pp. 151-155, Elsevier.

Barnwal et al., "Prospects of biodiesel production from vegetable oils in India," Renewable & Sustainable Energy Reviews, 2005, pp. 363-378, Elsevier.

U.S. Patent and Trademark Office, "Communication" for U.S. Appl. No. 11/394,133, mailed Dec. 22, 2008.

European Office Communication for EP Patent Application No. 06 011 066.5-2104, mailed Jan. 31, 2007, 2 pages.

European Office Communication for EP Patent Application No. 06 011 066.5-2104, mailed Apr. 10, 2007, 2 pages.

European Search Report for EP Patent Application No. 06 011 066.5-2104, mailed Oct. 18, 2006, 1 pages.

U.S. Patent and Trademark Office, "Office Communication" for U.S. Appl. No. 11/394,133 mailed Sep. 25, 2007, available in PAIR.

U.S. Patent and Trademark Office, "Office Communication" for U.S. Appl. No. 11/394,133 mailed May 19, 2008, available in PAIR.

* cited by examiner

PROCESS FOR THE PREPARATION OF LUBRICANTS

RELATED APPLICATION

This application is a continuation of Indian Patent Application No. 1561/DEL/2005, filed Jun. 16, 2005, which is incorporated by reference in its entirety.

FIELD OF THE INVENTION

The present invention relates to a process for preparation of lubricants. More particularly, it relates to an efficient process for producing lubricants, by reacting a vegetable oil or fat with an alcohol in the presence of a double metal cyanide catalyst.

The double metal cyanide catalyst used in the present invention is disclosed and claimed in a co-pending U.S. patent application Ser. No. 11/394,133 which is incorporated herein by reference.

BACKGROUND OF THE INVENTION

Shrinking crude oil reserves, limited refining capacity, concern about environmental protection and greenhouse gas effects have led to renewed interest in alternative fuels, lubricants and greases. In the last decade a new twist on an old idea, updated technologies are allowing researchers to develop bio-based lubricants that are more stable (towards oxidation and cold temperature) than the predecessors. These new oils, lubricants, greases and industrial fluids are derived from common plant products such as soybean, sunflower and canola (or in Europe, its close relative rapeseed) oil by transesterification of triglycerides with alcohols. Advantages of biolubricants include that they are renewable, biodegradable, less environmentally hazardous and safer to human contact unlike the petroleum-based lubricants and oils. Biolubricants are fatty acid alkyl esters having 22 to 26 carbon atoms. In recent years, for reasons ranging from religious, ethical and health issues there is a growing tendency towards using vegetable-based products in many formulations. Thus apart from its use in automobile industry, biolubricants find applications also in the manufacture of cosmetics, feedstuffs, soaps etc.

Several processes for transesterification of triglycerides have been developed: (1) Base-catalyzed transesterification of oil with alcohol (catalysts—alkaline metal alkoxides and hydroxides as well as sodium and potassium carbonates), (2) Direct acid-catalyzed esterification of the oil with alcohol (catalysts—Brönsted acids, preferably sulfonic acid and sulfuric acid), and (3) Conversion of oil to fatty acids and then to alkyl esters with acid catalysis. However, the former route (i.e., base-catalyzed reaction) is the most economical and in fact, is in practice in several countries for bio-diesel production (J. Braz. Chem. Soc. Vol. 9, No. 1, Year 1998, pages 199-210; J. Am. Oil. Chem. Soc. Vol. 77, No. 12, Year 2000, pages 1263-1266; Fuel Vol. 77, No. 12, year 1998, pages 1389-1391; Bioresource Tech. Vol. 92, Year 2004, pages 55-64; Bioresource Tech. Vol. 92, Year 2004, pages 297-305; Renewable Sustainable Engery Rev. Vol. 9, Year 2005, pages 363-378). Alkaline metal alkoxides (as $CH_3ONa$ for the methanolysis) are the most active catalysts, since they give very high yields (>98%) of fatty acid alkly esters in short reaction times (30 min) even if they are applied at low molar concentrations (0.5 mol %) (J. Food Composition and Analysis Year 2000, Vol. 13, pages 33-343). However, they require high quality oil and the absence of water, which makes them inappropriate for typical industrial processes (J. Braz. Chem. Soc. Vol. 9, No. 1, Year 1998, pages 199-210). Alkaline metal hydroxides (NaOH and KOH) are cheaper than metal alkoxides but require increasing catalyst concentration (1-2 mol %). NaOH is more superior to KOH as the latter and other alkali hydroxides yield more saponified products than the bio-fuel.

Recently, enzymatic transesterification using lipase has become more attractive for bio-fuel production, since the glycerol produced as a by-product can easily be recovered and the purification of fatty acid esters is relatively simple to accomplish. However, the main hurdle to commercialize this system is the cost of lipase production (J. Mol. Catal. B: Enzymatic Vol. 17, Year 2002, pages 133-142).

Use of immobilized lipases in the synthesis of fatty acid methyl esters from sunflower and soybean oils were reported by Soumanou and Bornscheuer and Watanabe et al (Enzy. Microbiol. Tech. Vol. 33, Year 2003, page 97; J. Mol. Catal. B: Enzymatic Vol. 17, Year 202, pages 151-155). They found that the immobilized enzyme is active at least for 120 h during five batch runs without significant loss of activity. Among the various lipases investigated the enzyme from *Pseudomonas fluorescens* (Amano AK) exhibited the highest conversion of oil. Khare and Nakajima (Food Chem. Vol. 68, Year 2000, pages 153-157) also reported the use of immobilized lipase enzyme.

Cost is the major factor slowing the commercialization of biofuels. Replacement of homogeneous by a solid catalyst eliminates the processing costs associated with the homogeneous catalysts. At the end of the reaction, the solid catalyst can be recovered by simple filtration from the product mixture and reused. Corma et al. (J. Catal. Vol. 173, Year 1998, page 315) evaluated transesterification of triglycerides with glycerol using basic solid catalysts such as Cs-MCM-41, Cs-Sepiolite and hydrotalcite. The reaction had to be carried out at 240° C. for 5 h to achieve high conversions. Hydrotalcite gave good conversion of 92% followed by Cs-sepiolite (45%) and Cs-MCM-41 (26%). Leclercq et al. (J. Am. Oil. Chem. Soc. Vol 78, Year 2001, page 1161) studied the transesterification of rapeseed oil in the presence of Cs-exchanged NaX and commercial hydrotalcite (KW2200) catalysts. At a high methanol to oil ratio of 275 and 22 h reaction time at methanol reflux, the Cs-exchanged NaX gave a conversion of 70% whereas 34% conversion was obtained over hydrotalcite. ETS-4 and ETS-10 catalysts gave conversions of 85.7% and 52.7%, respectively at 220° C. and 1.5 h reaction time (U.S. Pat. No. 5,508,457). Suppes et al (J. Am. Oil. Chem. Soc. Vol. 78, Year 2001, page 139) achieved a conversion of 78% at 240° C. and >95% at 160° C. using calcium carbonate rock as catalyst. Of late, Suppes et al reported the use of Na, K and Cs exchanged zeolite X, ETS-10, NaX occluded with $NaO_x$ and sodium azide in the transesterification of soybean oil with methanol (Appl. Catal. A: Gen. Vol. 257, Year 2004, page 213). Furuta et al (Catal. Commun. Vol. 5, Year 2004, pages 721-723) describe biodiesel production from soybean oil and methanol at 200-300° C. using solid superacid catalysts of sulfated tin and zirconium oxides with oil conversions over 90%. Use of tin complexes immobilized in ionic liquids for vegetable oil alcoholysis was reported by Abreu et al (J. Mol. Catal. A: Chem. Vol. 227, Year 2005, pages 263-267; J. Mol. Catal. A: Chem. Vol. 209, Year 2004, pages 29-33). Kim et al reported the use of heterogeneous base catalysts (Na/$NaOH/Al_2O_3$) for the methanolysis of vegetable oils U.S. Pat. No. 5,713,965 describes the production of biodiesel, lubricants and fuel and lubricant additives by traneseterification of triglycerides with short chain alcohols in the present of an organic solvent such as an alkane, arene, chlorinated solvent, or petroleum ether using *Mucor miehei* or *Candida* Antarctica-derived lipase catalyst. Patents Nos. WO 00/05327 A1, WO 02/28811 A1, WO 2004/048311 A1, WO 2005/021697 A1 and WO 2005/016560 A1 and U.S. Pat. Nos. 6,642,399, 6,399,800 also teach us the production fatty acid alkyl esters using either lipase catalysts or homogeneous acid/base catalysts. Patent No. WO 2004/085583 A1 describes transesterification of fats with methanol and ethanol in the presence of a solid acid catalyst having ultrastrong-acid properties in a short time at around ordinary pressure.

Most of the reports in the open literature are confined to preparation of fatty acid methyl or propyl esters for biodiesel applications. Studies on transesterification with long chain alcohol are scarce. Production of bio-diesel from pure soybean oil or coconut oil is not economical, so it is desirable to use cheaper alternative feedstocks such as animal fat or used cooked oil or oil from seeds of wild plants like jojoba and jatropha. Animal fat and used oil contain high amounts of free fatty acids (FFA) content. The FFA saponifies with the alkali-based transesterification catalyst leading to low yield, difficulties in separation of the products, and increase in production cost. In those cases a two step process wherein in the first step an acid catalyst esterifies the free fatty acids to methyl esters and in the second step a base catalyst transesterifies the triglycerides is generally employed in biolubricants preparation. An efficient solid catalyst, which can do this in a single-step is more advantageous. Thus more efficient catalysts that could circumvent the above drawbacks of the prior-art processes in lubricants preparation are highly desirable.

The present invention deals with a process, which eliminates most of the above said drawbacks. It deals with production of lubricants which comprises reacting of vegetable oils or fats with long chain alcohols say for example C6 to C8 alcohols at moderate conditions using a novel, solid, reusable double metal cyanide catalyst. The feedstock vegetable oil is a pure triglyceride or a mixture of fatty acids and tryglycerides. One of the metals of the double metal cyanide catalyst is $Zn^{2+}$ while the other is Fe. Co-existence of Zn and Fe in the active site linking through cyano bridges makes it efficient to transform feedstocks containing fatty acids in a single step to fatty acid esters. The catalyst could be separated easily by centrifugation or by simple filtration and reused. Most importantly, the catalyst is highly efficient and only a small amount (1 wt % of oil) is needed to carryout the reaction. The process is atom-efficient and the reaction conditions like temperature and pressure are only moderate. Unlike the conventional base catalysts the catalyst of the present invention is more efficient even in the presence of water impurity in oil. Hence, there are no limitations on the quality of oil that should be used with the present catalysts.

OBJECTIVES OF THE INVENTION

The main object of the invention is to provide a process for the preparation of lubricants of high conversion accompanied with high selectivity for lubricants using a heterogeneous catalyst.

Another object is to provide a single-step process for the production of lubricants from used cooking oils or oils or fats containing significant amount of fatty acids.

Yet another object of the present invention is to produce lubricants by reacting vegetable oil or fat with C6-C8 alcohol at moderate conditions and shorter reaction times.

SUMMARY OF THE INVENTION

An improved process for the preparation of lubricants, the said process comprising the steps of:
a) dissolving the vegetative oil or fat in an alcohol,
b) mixing the above said solution obtained in step(a) with a double metal cyanide catalyst, followed by stirring, at a temperature in the range of 150° to 200° C., for a period of 3-6 hrs,
c) cooling the above said reaction mixture to a temperature of about 25° C.,
d) separating the catalyst from the above said reaction mixture and removing the unreacted alcohol by known methods followed by separation of glycerol by-products by adding petroleum ether and methanol to obtain the desired esterified product.

In an embodiment of the present invention wherein the vegetable oil used is selected from the group consisting of coconut oil, sunflower oil, soybean oil, mustered oil, olive oil, margarine oil, jojoba oil, jatropha oil and mixtures thereof.

In another embodiment of the invention the fat used is selected from an animal source.

In yet another embodiment of the invention the molar ratio of oil to alcohol used in step(a) is in the range of 1:5-1:15.

In yet another embodiment of the invention the alcohol used is normal or branched alcohol selected from the group consisting of hexanol, heptanol, octanol and mixture thereof.

In yet embodiment the catalyst used has a general formula

$Zn_3M_2(CN)_n(ROH).xZnCl_2.yH_2O$ wherein R is tertiary-butyl and M is a transition metal ion selected from Fe, Co and Cr, x varies from 0 to 0.5, y varies from 3-5 and n is 10 or 12.

In yet another embodiment the product lubricant obtained comprises of $C_{22}$-$C_{28}$ fatty acid alkyl esters.

In still another embodiment of the invention the conversion of oil to lubricant obtained is in the range of 90.0-96.0 mol %.

DETAILED DESCRIPTION OF THE INVENTION

In the investigations leading to the present invention, it was found that the double metal cyanide catalysts are highly efficient and could be easily separated from the products for further reuse. The prior art catalysts, mineral acid, alkali bases and lipases need additional expenses for catalyst separation. An easily separable catalyst system e.g., the catalyst of the present invention is beneficial and leads to an economic and eco-friendly process. Hence, the solid catalysts of the present invention are not only efficient but avoid the tedious process of catalyst recovery characteristic of the prior art processes. The present catalyst system is efficient without using any additional solvent.

The present invention is an improved process for the preparation of lubricants, the said process comprising the steps of:
a) dissolving the vegetative oil or fat in an alcohol,
b) mixing the above said solution obtained in step(a) with a double metal cyanide catalyst, followed by stirring, at a temperature in the range of 150° to 200° C., for a period of 3-6 hrs,
c) cooling the above said reaction mixture to a temperature of about 25° C.,
d) separating the catalyst from the above said reaction mixture and removing the unreacted alcohol by known methods followed by separation of glycerol by-products by adding petroleum ether and methanol to obtain the desired esterified product.

The present invention deals with production of lubricants which comprises reacting of vegetable oils or fats with long chain alcohols say for example C6 to C8 alcohols at moderate conditions using a novel, solid, reusable double metal cyanide catalyst. The feedstock vegetable oil is a pure triglyceride or a mixture of fatty acids and tryglycerides. One of the metals of the double metal cyanide catalyst is $Zn^{2+}$ while the other is Fe. Co-existence of Zn and Fe in the active site linking through cyano bridges makes it efficient to transform feedstocks containing fatty acids in a single step to fatty acid esters. The catalyst could be separated easily by centrifugation or by simple filtration and reused. Most importantly, the catalyst is highly efficient and only a small amount (1 wt % of oil) is needed to carryout the reaction. The process is atom-efficient and the reaction conditions like temperature and pressure are only moderate. Unlike the conventional base catalysts the catalyst of the present invention is more efficient even in the presence of water impurity in oil. Hence, there are no limitations on the quality of oil that should be used with the present catalysts.

The process described above has the combined unique advantages of high conversion accompanied with high selectivity for lubricants.

The catalyst can be easily separated from the product mixture and no issues related to saponification are encountered.

The catalyst of the present invention is highly efficient for the preparation of lubricants from vegetable oil or fats and C6-C8 alcohols.

The present invention is illustrated herein below with examples, which are illustrative only and should not be construed to limit the scope of the present invention in any manner.

Example 1

This example illustrates the preparation of the Fe—Zn double metal cyanide catalyst of the present invention. In a typical catalyst preparation, $K_4[Fe(CN)_6]$ (0.01 mol) was dissolved in double distilled water (40 ml) (Solution-1). $ZnCl_2$ (0.1 mol) was dissolved in a mixture of distilled water (100 ml) and tertiary-butanol (20 ml) (Solution)-2. Poly(ethylene glycol)-block-poly(propylene glycol)-block-poly(ethylene glycol) ($EO_{20}$-$PO_{70}$-$EO_{20}$; molecular weight of about 5800) (15 g) was separately dissolved in 2 ml of distilled water and 40 ml of tertiary-butanol (Solution-3). Solution-2 was added to solution-1 over 60 min at 50° C. with vigorous stirring. White precipitation occurred during the addition. Then, solution-3 was added to the above reaction mixture over a period of 5 min and stirring was continued for further 1 h. The solid cake formed was filtered, washed with distilled water (500 ml) and dried at 25° C. for 2-3 days. This material was activated at 180-200° C. for 4 h prior to using it in the reactions.

TABLE-1 lists the physicochemical characteristics of the catalyst used in lubricants preparation.

Example 2

This example describes the preparation of lubricants from coconut oil and n-octanol. In a typical reaction, coconut oil (5 g), n-octanol (oil:alcohol molar ratio=1:6) and double metal cyanide Fe—Zn catalyst (50 mg; 1 wt % of oil) were charged into a 100 ml stainless steel autoclave having a teflon-liner. The autoclave was then placed in a rotating synthesis reactor (Hiro Co., Japan, Mode-KH 02; rotating speed=30 rpm) and the reaction was conducted at 170° C. for 4 h. It was then allowed to cool to 25° C.

First, catalyst was separated by centrifugation/filtration from the reaction mixture. Then, by vacuum distillation unreacted octanol in the reaction mixture was removed. Pet ether (60 ml) and methanol (20 ml) were added to separate out the glycerol by-product from the reaction mixture. The methanol layer containing glycerol-by-product was separated. This process of glycerol separation was repeated 2-3 times. Glycerol was isolated by distilling out methanol under vaccum. Later, the ether portion was distilled out to obtained the esterified products. A portion of the esterified products (100 mg) was diluted with dichloromethane (1 g) for analysis by gas chromatography. The products were identified by GC-MS.

Example 3

This example illustrates the preparation of lubricants from sunflower oil and n-octanol. In a typical reaction, sunflower oil (5 g), n-octanol (oil:alcohol molar ratio=1:6) and double metal cyanide Fe—Zn catalyst (50 mg; 1 wt % of oil) were charged into a 100 ml stainless steel autoclave having a teflon-liner. The autoclave was then placed in a rotating synthesis reactor (Hiro Co., Japan, Mode-KH 02; rotating speed=30 rpm) and the reaction was conducted at 170° C. for 4 h. It was then allowed to cool to 25° C. The products were isolated and analyzed as described in EXAMPLE 2.

Example 4

This example describes the preparation of lubricants from soybean oil and n-octanol. In a typical reaction, soybean oil (5 g), n-octanol (oil:alcohol molar ratio=1:6) and double metal cyanide Fe—Zn catalyst (50 mg; 1 wt % of oil) were charged into a 100 ml stainless steel autoclave having a teflon-liner. The autoclave was then placed in a rotating synthesis reactor (Hiro Co., Japan, Mode-KH 02; rotating speed=30 rpm) and the reaction was conducted at 170° C. for 4 h. It was then allowed to cool to 25° C. The products were isolated and analyzed as described in EXAMPLE 2.

Example 5

This example describes the preparation of lubricants from margarine oil and n-octanol. In a typical reaction, margarine oil (5 g), n-octanol (oil:alcohol molar ratio=1:6) and double metal cyanide Fe—Zn catalyst (50 mg; 1 wt % of oil) were charged into a 100 ml stainless steel autoclave having a teflon-liner. The autoclave was then placed in a rotating synthesis reactor (Hiro Co., Japan, Mode-KH 02; rotating speed=30 rpm) and the reaction was conducted at 170° C. for 4 h. It was then allowed to cool to 25° C. The products were isolated and analyzed as described in EXAMPLE 2.

Example 6

This example describes the preparation of lubricants from margarine oil and n-hexanol. In a typical reaction, margarine oil (5 g), n-hexanol (oil:alcohol molar ratio=1:6) and double metal cyanide Fe—Zn catalyst (50 mg; 1 wt % of oil) were charged into a 100 ml stainless steel autoclave having a teflon-liner. The autoclave was then placed in a rotating synthesis reactor (Hiro Co., Japan, Mode-KH 02; rotating speed=30 rpm) and the reaction was conducted at 170° C. for 4 h. It was then allowed to cool to 25° C. The products were isolated and analyzed as described in EXAMPLE 2.

Example 7

This example describes the preparation of lubricants from margarine oil and n-octanol using conventional prior-art catalyst KOH. In a typical reaction, margarine oil (5 g), n-octanol (oil:alcohol molar ratio=1:6) and KOH (50 mg; 1 wt % of oil) were charged into a 100 ml stainless steel autoclave having a teflon-liner. The autoclave was then placed in a rotating synthesis reactor (Hiro Co., Japan, Mode-KH 02; rotating speed=30 rpm) and the reaction was conducted at 170° C. for 4 h. It was then allowed to cool to 25° C. The products were isolated and analyzed as described in EXAMPLE 2.

Example 8

This example illustrates the preparation of lubricants from used/cooked-margarine oil and n-octanol. In a typical reaction, margarine oil (5 g), n-octanol (oil:alcohol molar ratio=1:6) and double metal cyanide Fe—Zn catalyst (50 mg; 1 wt % of oil) were charged into a 100 ml stainless steel autoclave having a teflon-liner. The autoclave was then placed in a rotating synthesis reactor (Hiro Co., Japan, Mode-KH 02; rotating speed=30 rpm) and the reaction was conducted at 170° C. for 4 h. It was then allowed to cool to 25° C. The products were isolated and analyzed as described in EXAMPLE 2.

TABLE 1

Physocochemical characteristics of the double metal cyanide (Fe—Zn) catalyst.

| Textural Characteristics: | |
| --- | --- |
| Total surface area ($S_{BET}$) | 38.4 m$^2$/g |
| External surface area ($S_{Exm.}$) | 24.1 m$^2$/g |
| Micropore area | 14.3 m$^2$/g |
| Average pore diameter | 3.9 nm |
| Total pore volume | 0.037 cc/g |
| Elemental analysis: | |
| % C-content | 23.3 |
| % H-content | 2.24 |
| % N-content | 17.3 |
| Morphology (SEM): | Spherical shaped particles |
| Spectral characteristics: | |
| FT-IR band positions (in cm$^{-1}$) | 2096 ($v$(C≡N)), 1230 ($v$(C—O)), 500 ($v$(Fe—C)) |
| Diffuse reflectance UV-visible bands (in nm) | 405, 330, 278, 236 and 208 |

TABLE-2 lists the results of catalytic activity studies exemplified in EXAMPLES 2-8.

TABLE 2

Lubricants preparation: catalytic activity data

| Example No. | Oil | Alcohol | Conversion of triglycerides into glycerol (mol %) | Alkyl esters selectivity (mol %) |
| --- | --- | --- | --- | --- |
| Example 2 | Coconut oil | Octanol | 92.5 | Octyl laurate (40.5%) |
| | | | | Octyl myristate (22%) |
| | | | | Octyl palmitate (11%) |
| | | | | Octyl oleate + Octyl stereate + Octyl linoleate (13.6%) |
| Example 3 | Sunflower oil | Octanol | 91.0 | Octyl palmitate (7.9%) |
| | | | | Octyl oleate + Octyl stereate + Octyl linoleate (92.1%) |
| Example 4 | Soybean oil | Octanol | 92.0 | Octyl esters (99%) |
| Example 5 | Margarine | Octanol | 91.0 | Octyl palmitate (13.8%) |
| | | | | Octyl oleate + Octyl stereate + Octyl linoleate (86.2%) |
| Example 6 | Margarine | Hexanol | 91.0 | Octyl palmitate (12.7%) |
| | | | | Octyl oleate + Octyl stereate + Octyl linoleate (84.2%) |
| Example 7 | Margarine-used/cooked oil | Octanol | 92.0 | Octyl palmitate (13.8%) |
| | | | | Octyl oleate + Octyl stereate + Octyl linoleate (86.2%) |
| Example 8 | Margarine | Octanol | 96.0 | Octyl palmitate (13.8%) |
| | | | | Octyl oleate + Octyl stereate + Octyl linoleate (86.2%) |

Advantages of the Invention

1. The process described above has the combined unique advantages of high conversion accompanied with high selectivity for lubricants.

2. The catalyst can be easily separated from the product mixture and no issues related to saponification are encountered.

3. The catalyst of the present invention is highly efficient for the preparation of lubricants from vegetable oil or fats and C6-C8 alcohols.

We claim:

1. An improved process for the preparation of lubricants-comprising:
   a) dissolving a vegetative oil or fat in an alcohol,
   b) mixing the above said solution obtained in step(a) with a double metal cyanide catalyst that remains insoluble in the obtained mixture, followed by stifling, at a temperature in the range of 150° to 200° C., for a period of 3-6 hrs,
   c) cooling the above said reaction mixture to a temperature of about 25° C.,
   d) separating the catalyst from the above said reaction mixture
   e) removing the unreacted alcohol by distillation; and
   f) separation of glycerol by-products by adding petroleum ether and methanol to obtain the desired esterified product.
   wherein the conversion of oil to lubricant is in the range of 90.0-96.0 mol %.

2. The process of claim 1, wherein the vegetable oil used is selected from the group consisting of coconut oil, sunflower oil, soybean oil, mustered oil, olive oil, margarine oil, jojoba oil, jatropha oil and mixtures thereof.

3. The process of claim 1, wherein the fat used is obtained from an animal source.

4. The process of claim 1, wherein the molar ratio of oil to alcohol used in step(a) is in the range of 1:5-1:15.

5. The process of claim 1, wherein the alcohol used is normal or branched alcohol selected from the group consisting of hexanol, heptanol, octanol and their mixture thereof.

6. The process of claim 1, wherein the catalyst used has a general formula:

wherein R is tertiary-butyl and M is a transition metal ion selected from Fe, Co and Cr, x varies from 0 to 0.5, y varies from 3-5 and n is 10 or 12.

7. The process of claim 1, wherein the product lubricant obtained comprises of $C_{22}$-$C_{28}$ fatty acid alkyl esters.

* * * * *

UNITED STATES PATENT AND TRADEMARK OFFICE
CERTIFICATE OF CORRECTION

PATENT NO.         : 7,842,653 B2
APPLICATION NO.    : 11/442651
DATED              : November 30, 2010
INVENTOR(S)        : Darbha et al.

It is certified that error appears in the above-identified patent and that said Letters Patent is hereby corrected as shown below:

In the Claims:

Claim 1, col. 8, line 15, please delete "stifling" and substitute therefor -- stirring --.

Signed and Sealed this
Third Day of May, 2011

David J. Kappos
*Director of the United States Patent and Trademark Office*